United States Patent
Ziegler et al.

(10) Patent No.: US 6,801,307 B2
(45) Date of Patent: Oct. 5, 2004

(54) MODULAR MEASURING OR TESTING DEVICE

(75) Inventors: Jochen Ziegler, Stuttgart (DE); Ralf Haefner, Holzgerlingen (DE); Alf Clement, Aidlingen (DE)

(73) Assignee: Agilent Technologies Inc., Palo Alto, CA (US)

( * ) Notice: Subject to any disclaimer, the term of this patent is extended or adjusted under 35 U.S.C. 154(b) by 171 days.

(21) Appl. No.: 10/061,780

(22) Filed: Feb. 1, 2002

(65) Prior Publication Data

US 2002/0109509 A1 Aug. 15, 2002

(30) Foreign Application Priority Data

Feb. 10, 2001 (DE) .......................................... 101 06 138

(51) Int. Cl.⁷ .............................................. G01N 21/00
(52) U.S. Cl. ..................................................... 356/73.1
(58) Field of Search ................ 356/73.1; 250/328–334; 385/15–53

(56) References Cited

U.S. PATENT DOCUMENTS

| | | | | |
|---|---|---|---|---|
| 5,517,015 A | * | 5/1996 | Curry et al. | ................. 235/492 |
| 6,062,478 A | * | 5/2000 | Izaguirre et al. | ....... 235/462.47 |
| 6,517,777 B2 | * | 2/2003 | Liljestrand et al. | ........... 422/52 |

* cited by examiner

*Primary Examiner*—Tu T. Nguyen

(57) ABSTRACT

A modular, portable device is used to measure or test components in optical networks. It contains a base module with base electronics, which features controls and a display device on the front; at least one function module, which is attached by means of a mechanical interface to the outside of the back of the base module, and contains a functional unit with measurement or test electronics, which work together with the base electronics through a functional interface, wherein the function module is detachably joined to the base module and, depending on the application, may be replaced with another function module with another functional unit.

21 Claims, 5 Drawing Sheets

MODULAR MEASURING OR TESTING DEVICE

BACKGROUND OF THE INVENTION

Field of the Invention

The present invention concerns a modular, portable device to measure or test components in optical or electrical networks.

Discussion of the Background Art

Such devices are used to test and measure the performance or function of a component in an optical or electrical network, i.e. a data network with optical or electrical data transmission. In order to ensure mobile use of this devices, they must be of a portable size, meaning that the devices must have small dimensions and low weight.

A conventional device, such as the Agilent E6000-Series from Agilent Technologies, has a base module containing base electronics with a programmed, or programmable, computer and storage medium. On the front side of the base module are controls, e.g. keys and buttons, as well as a display device in the form of an LCD display. On the back of the base module is a receptor shaft, which acts as a receptor for the function module. Such a function module contains a functional unit with measuring or testing electronics, which work together with the base electronics of the base module when the function module is attached. The function module may contain a laser, for example, which is used to generate measurement or test signals.

In order to carry out various measurement and test procedures, various function modules are provided, which are interchangeable and are each individually inserted into the receptor shaft. The various function modules may be fitted with lasers, for example, which vary in wavelength and capacity. When an optical cable is to be measured with several different wavelengths, for example, it may be necessary for the function modules to be inserted in succession into the receptor shaft. Due to the size of the receptor shaft on the base module, the dimensions of the function module are predetermined. Given the thus limited space available, there is reduced variability for the modular device.

SUMMARY OF THE INVENTION

The problem of the present invention is to develop an improved embodiment for the modular device as initially described. This problem will be solved by the characteristics of the independent claims. Advantageous embodiments are stated in the dependent claims.

The invention is based on the concept of attaching the function modules to the outside of the back of the base model, wherein appropriate mechanical and functional interfaces, i.e. electrical or optical, are provided. Through this, the function modules can be designed freely with respect to their size such that essentially any functional units maybe used as no predetermined or restricted clearance needs to be allowed for. Accordingly, the function units, which cannot be inserted into the receptor shaft of a conventional device due to their size, but can be easily attached to the base module of the device according to the invention, can thus be used. The variability of the device according to the invention is thus increased. Furthermore, certain function modules may be built relatively flat, thus reducing the size of the device and improving the ease of handling. Whereas the largest function module in a conventional device determines the size of the receptor shaft and hence the base module, the dimensions of the device according to the invention are variable and are reflected in the function module attached to the respective base module.

In one advantageous embodiment, a mechanical interface may also be attached to the back of the function module, into the back of which a further function module containing another functional unit may be attached. The latter works together with the functional unit of the first function module, or with the base electronics of the base module, through a functional interface. The base module can thus be simultaneously fitted with two or more function modules, which are each at least linked to the base module, and preferably to each other. This coupling or link can be made such that the functional interfaces (electrical or optical) in the function modules are connected through in the form of a bus. When a measurement or test procedure must be carried out, in which two different function modules would have to be exchanged in a conventional device, no complicated modification is necessary in the device according to the invention, as both necessary function modules are attached to the base module ready for use.

An embodiment is effective if the mechanical interface between the function module and base module, as well as the mechanical interface between two function modules, are essentially set up identical or compatible. The different function modules may thus be attached to the base module, or to each other, in any sequence, thus increasing the variability of the modular device.

BRIEF DESCRIPTION OF THE DRAWINGS

The following gives a further description of the invention with reference to the drawings, wherein the same reference marks refer to identical, functionally identical, or similar features. It is shown schematically in FIG. 1 a perspective view of the device according to the invention in the first combination between the base module and function module, FIG. 2 a view as in FIG. 1, but with a second combination of base module and function modules, FIG. 3 a perspective view of the back of the base module, FIG. 4 a perspective view on the front of the function module and FIG. 5 a perspective view of the back of the function module.

DETAILED DESCRIPTION OF THE DRAWINGS

Figure 1:
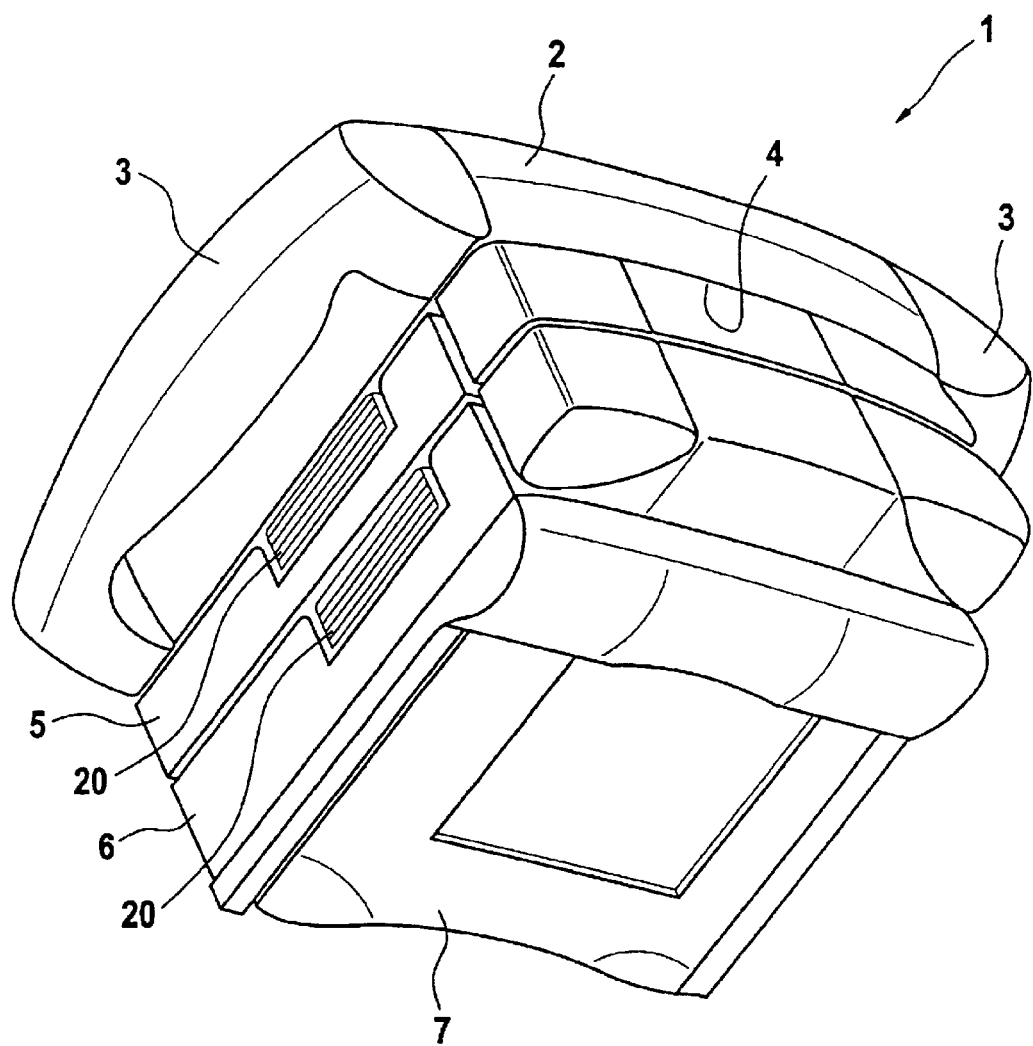

In FIG. 1, the device 1 according to the invention has a base module 2, which has handles 3 on either side and is regularly fitted with controls and at least a display device on the front at the far end from the viewer. The base module 2 contains base electronics not seen here, which in particular enable device 1 to initialize and analyze certain test and measurement.

The device 1 may in particular comprise an electrical time domain reflectometer (TDR), or may be configured as such, which may be used to characterize or measure an electrical cable, such as a co-axial transmission cable, telephone cable, or other supply such as piping. The device 1 may equally comprise an optical time domain reflectometer (OTDR), or may be configured as such, which may be used to characterize/measure attenuation, homogeneity, splice waste, interruptions, the length, or the like, of an optical fiber. Furthermore, the device 1 may comprise a wavelength division multiplexing (WDM) test device, or may be configured as such, which can be used to test/measure wavelength division multiplexing signals.

Two function modules 5 and 6, as well as an end module 7, are attached to the rear side 4 of the base module 2 on the near side to the viewer. Each of these function modules 5, 6 contain a functional unit not seen here with measurement and test electronics and at least a laser to generate a laser beam with a certain capacity at a certain frequency or frequency band. For example, the function modules 5 and 6 may differ such that the lasers from their functional units have different capacities, frequencies, and frequency bands. Instead of a laser, the functional units may contain peripheral devices, such as a printer or a wireless telecommunications unit.

An end module 7 is attached to the rear side of the last or rear function module 6. This is used to protect the rear function module 6, and can also be fitted with a support medium, neither displayed nor described here in any detail, with which the device 1 on the base may be supported.

Given that the function modules 5 and 6 are attached to the outside of the back 4 of the base module 2, these can be built to any size. This is especially apparent in FIG. 2, as two different sized function modules 8 and 9 are attached to the back 4 of the base module 2. For example, considerably more complex measurement and test electronics can be integrated into the larger function module 9 than into the function module 8. The function module 9 may already also contain more different lasers.

Figure 2:
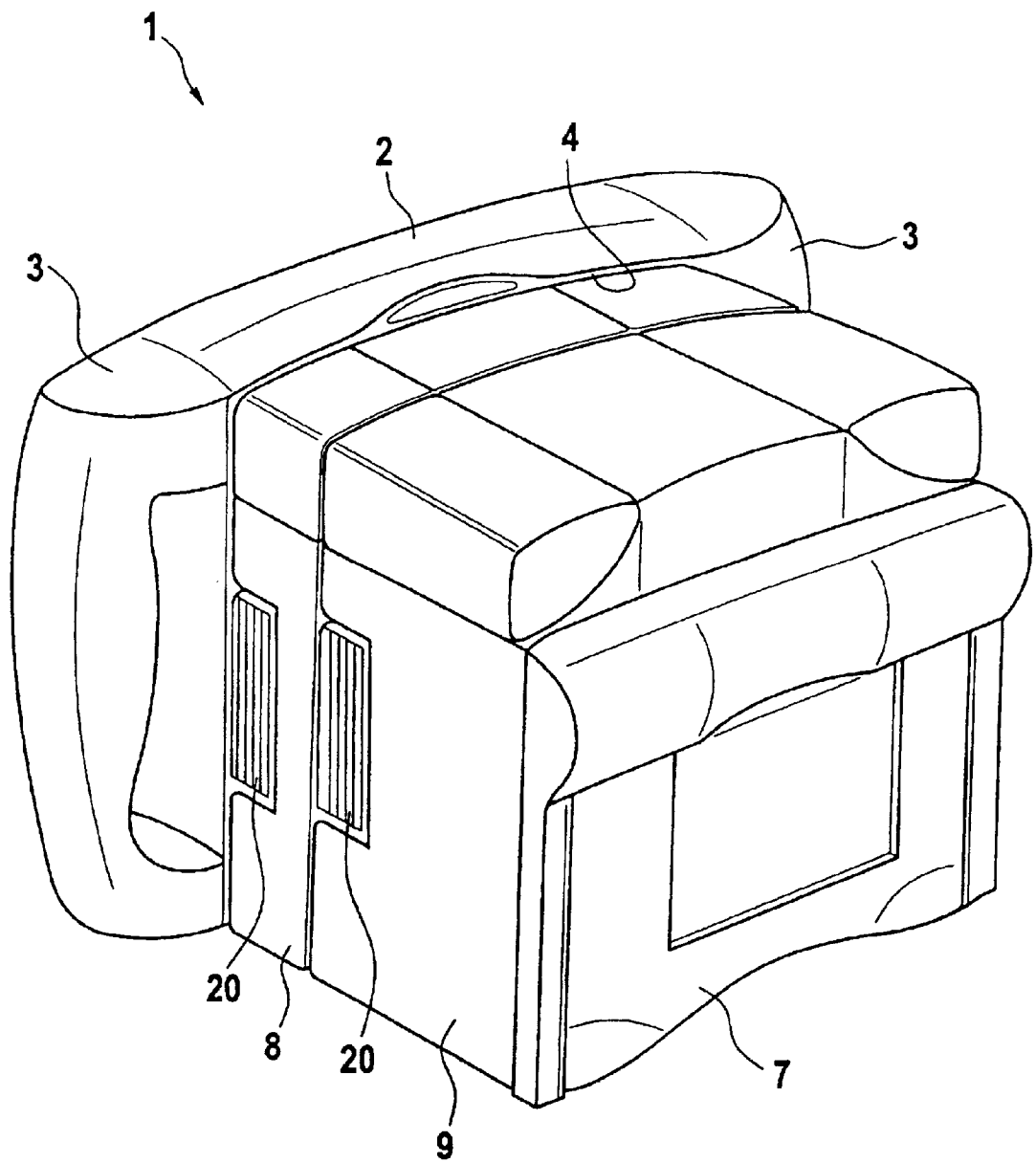

As shown in FIGS. 1 and 2, the various function modules 5, 6, 8, 9 vary in size in this example simply with regards to depth, whereas their width and height are the same. Accordingly, the function modules 5, 6, 8, 9 congruently attach to each other. It therefore practical to set the width and height of the function modules 5, 6, 8, 9 to be the same as the measurements of the back 4 of the base module 2.

In order to attach the individual modules 2, 5, 6, 7, 8, 9 to each other, mechanical interfaces are provided, which are concealed by the modules in FIGS. 1 and 2. Functional interfaces, also concealed in FIGS. 1 and 2 by the attached modules, are also provided for the coupling of the modules and their functional units. These functional interfaces can be electrical or optical, and can form an electrical, electronic or optical coupling of the modules.

Figure 3:
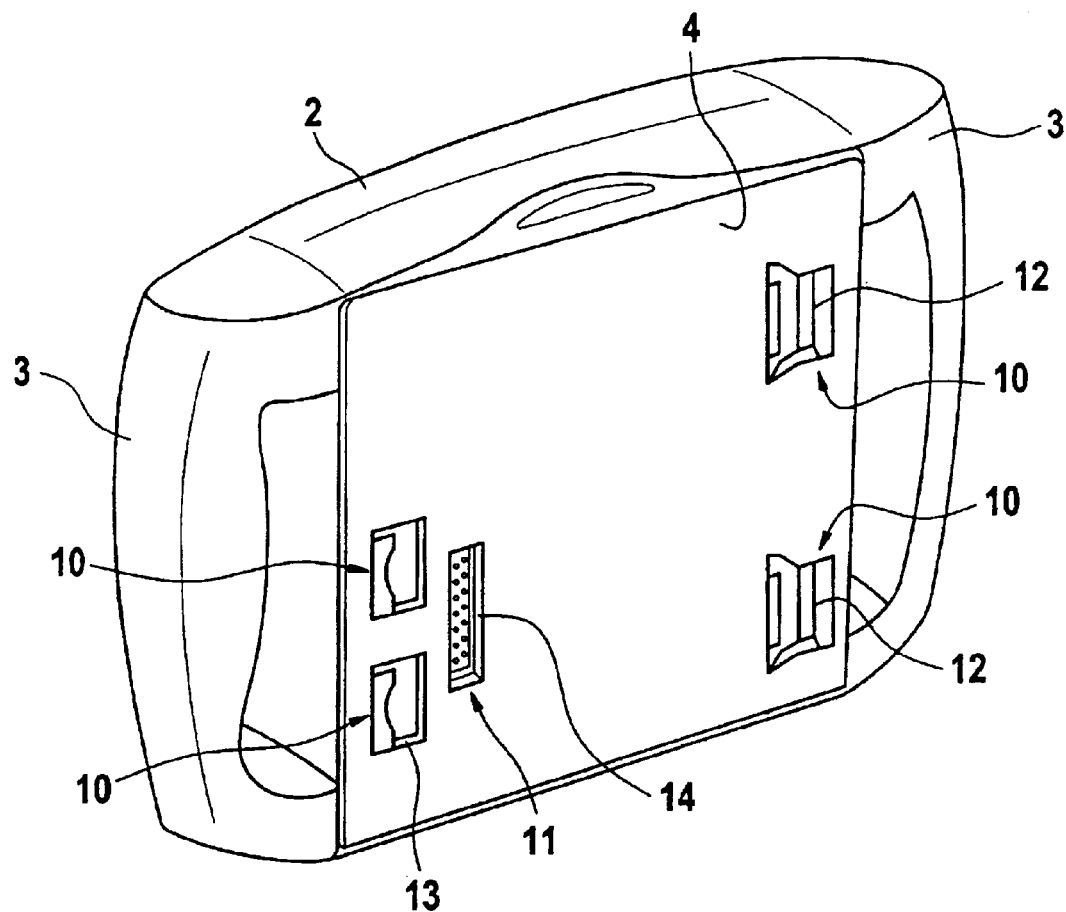

In FIG. 3, the base module 2 is shown without any attached function module, such that the back 4 is nearest to the viewer and is not concealed. Accordingly, components of the aforementioned mechanical interface 10 and electrical interface 11 attached to the base module 2 are visible. The interface is electrical in this example and is subsequently referred to as such. The mechanical interface 10 has two support openings 12 at a certain distance from each other on the side of the base module 2. The mechanical interface 10 also includes two snap-in openings 13 at a certain distance from each other on the side of the base module 2 lying opposite the support openings 12. The electrical interface 11 has a multi-polar plug-in 14.

Figure 4:
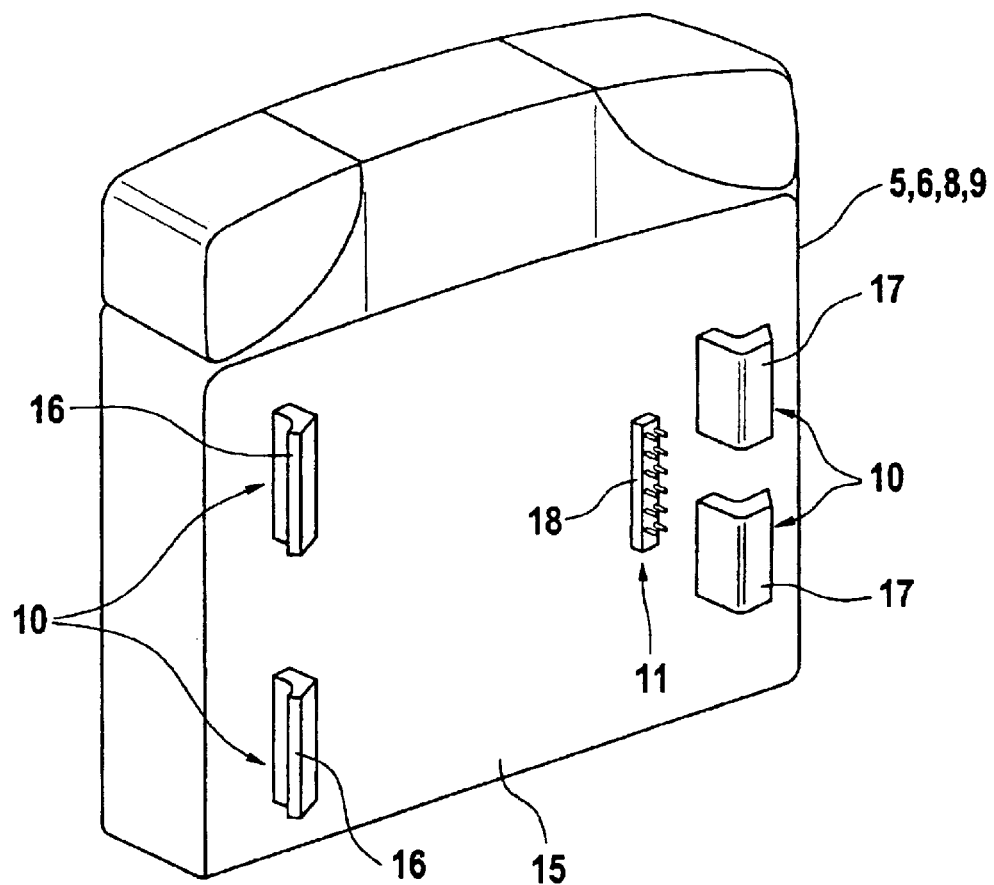

FIG. 4 shows the front side of the function modules 5, 6, 8, 9 in a state wherein they are not mounted on the base module. The mechanical interface 10 and the electrical interface 11 feature components on the front 15, which are complimentary to those found on the back 4 of the base module 2. Accordingly, the mechanical interface 10 features two support hooks 16, which are flexed and pointed outwards in a sideways manner on the side of the support openings 12. These support hooks 16 are rigidly fixed to the function modules 5, 6, 8, 9 and mesh into the support openings 12 when attaching the function modules 5, 6, 8, 9 on the base module 2, wherein they neatly fit behind the opening edge of the support openings 12. The mechanical interface 10 also has snap-in hooks 17 on the side of the snap-in openings 13, which may be vertically swivel-mounted onto the function modules 5, 6, 8, 9, around a vertical axis. These snap-in hooks 17 are also flexed and pointed outwards. When attaching the function modules 5, 6, 8, 9 to the base module 2, the snap-in hooks 17 go through the snap-in openings 13, where they are turned inwards. As soon as the snap-in hooks 17 are moved past the opening edge of the snap-in openings 13, they lock onto the opening edge, wherein they turn outwards and tightly fit behind the respective opening edge. The snap-in hooks 17 are then sprung outwards with suitable springs such that they automatically lock onto the opening edge of the snap-in openings 13. In this respect, the mechanical interface 10 forms a quick-connector, which simplifies the attachment of the function modules 5, 6, 8, 9 onto the base module 2.

The electrical interface 11 features a multi-polar plug 18 on the front 15 of the function modules 5, 6, 8, 9, which is complimentary to the plug-in 14 of the base module 2. In attaching the function modules 5, 6, 8, 9 to the base module 2, the plug 18 is inserted into the plug-in 14 at the same time as when the snap-in hooks 17 are locked into the snap-in openings 13, wherein the electrical interface 11 is automatically connected.

Figure 5:
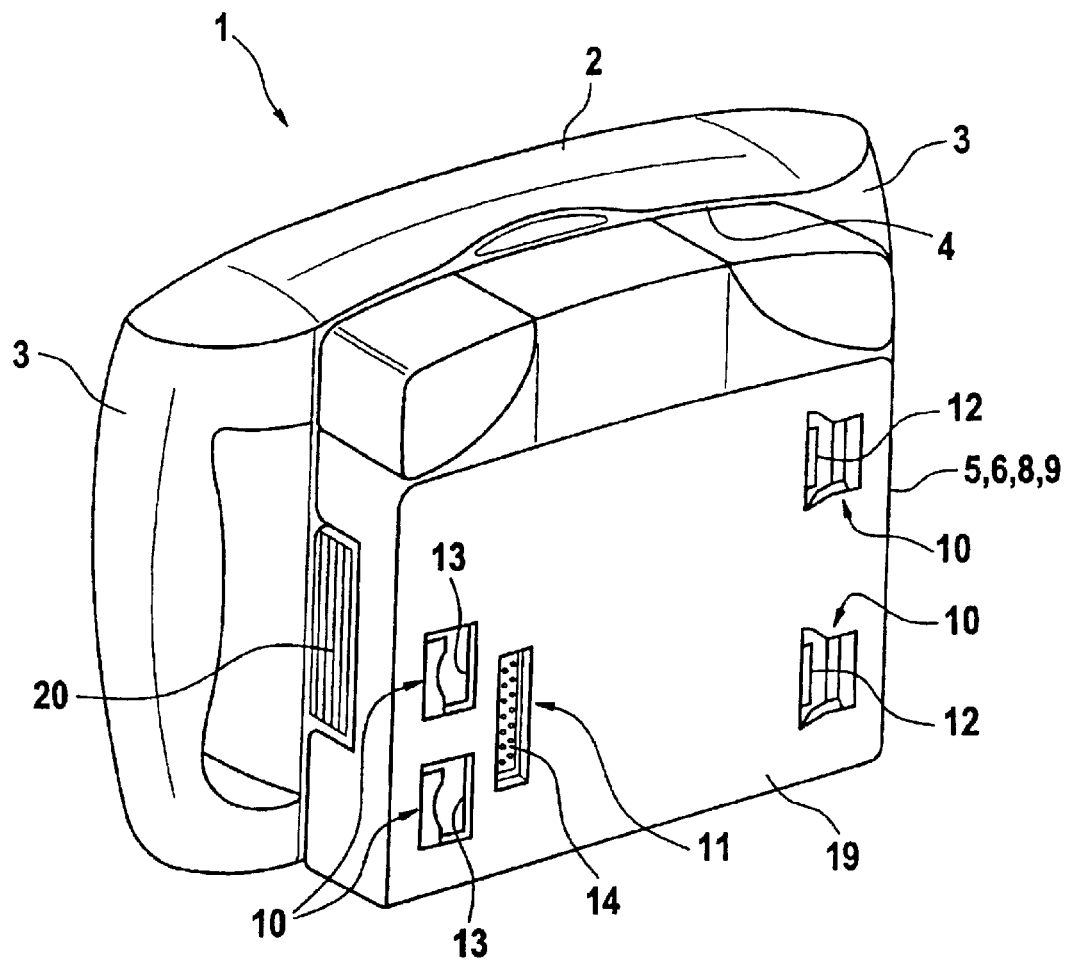

FIG. 5 shows one of the function modules 5, 6, 8, 9, attached to the base module 2. On the back 19 of the function module on the near side to the viewer, the components, namely the support openings 12 and the snap-in openings 13, of the mechanical interface 10, which are also arranged on the back 4 of the base module, are configured in a selected embodiment in an identical manner. In the same way, the back 19 of the function module 5, 6, 8, 9 has the same components as the electrical interface 11, namely a multi-polar plug-in 14, which is also attached to the back 4 of the base module 2. This configuration ensures that a further function module may be attached to the function module, just as a function module may be attached to the base module 2. The functional interface 11 ensures that the functional units in FIGS. 1 and 2 of the function modules 6 and 9 attached to function modules 5 and 8 can communicate with the base electronics of the base module 2. Additionally, or alternatively, the functional units of the function modules 6 and 9, attached to the function modules 5 and 8, can communicate with the functional units of function modules 5 and 8, which are attached to the base module 2. For this purpose, the device 1 has a communication bus, to which the functional units of the function modules may be connected via the electrical interfaces 11. For this purpose, the functional interfaces 11 connected through the individual function modules. Data exchange is carried out between the connected components through the functional, here electrical, interface 11 and the communication bus. Power supply may also be connected through this.

The end module 7 is also fitted with the components, namely the support hooks 16 and the snap-in hooks 17 (c.f. FIG. 4), of the mechanical interface 10, which are attached to the front 15 of the function modules 5, 6, 8, 9. The end module 7 can thus be attached to each function module 5, 6, 8, 9, as well as directly to the base module 2. In an alternative embodiment, a different mechanical interface may be used for attaching the end module 7, for example in order to avoid an error in removing the end module 7 when handling the device 1.

The end module 7 is chiefly designed as a protective cover and therefore has impact-proof and shock-absorbent areas. Furthermore, the end module 7 forms a cover, in particular a dust-proof cover, for the exposed components of the mechanical interface 10 and electrical interface 11 of the function module, to which the end module 7 is connected.

In the embodiment displayed, the end module 7 is configured as a separate module. An embodiment is also possible, in which the end module is fully integrated into a special function module, to which no further modules may be attached.

FIGS. 1, 2, 5 shows a key 20 installed for each function module 5, 6, 8, 9, which is connected with the swiveling snap-in hooks 17 of its respective function module. This key 20 serves as a release trigger for the mechanical interface 10. Through an appropriate functional link between the key 20 and the swiveling snap-in hooks 17, the key 20 can cause the snap-in hooks 17 to turn inwards, wherein the opening edge of the snap-in openings 13 is released such that the snap-in hooks 17 may be extracted through the respective snap-in opening 13.

Although the displayed embodiment shows the hooks 16, 17 of the mechanical interface 10 as always configured at the front 15 of the function modules 5, 6, 8, 9 and, if applicable, the end module 7, another embodiment is also possible in which the support hooks 16 or the snap-in hooks 17 are configured on the back 19 of the function modules 5, 6, 8, 9 and the back 4 of the base module 2. Accordingly, the openings 12 and 13 are found at the accompanying front 15 of the function modules 5, 6, 8, 9 and, if applicable, the end module 7.

The back 4 of the base module 2 and the back 19 of the function modules 5, 6, 8, 9, as well as the front 15 of the function modules and end module 7, are thus essentially flat, such that the individual modules spread adjacently over a wide area when linked together.

With the assistance of the base module 2 according to the invention, as well as the function modules 5, 6, 8, 9, which are each different with respect to their functional units, a modular device system can be established, which is especially adaptable for different test or measurement procedures. Relatively large function modules (cf. function module 9 in FIG. 2) can thus be attached as necessary to the base module 2. It is also possible in another embodiment to attach an extremely flat function module to the base module 2, thus ensuring a constantly optimal ease of handling for the thus assembled device 1.

In one embodiment for such a device system, the function modules 5, 6, 8, 9 can be fitted with a mechanical coding device, the encoding from which blocks any functionally unreasonable combination of function modules. Such a coding device can, for example, be attached to a module with protruding pins, which, with an permissible combination, insert into the corresponding receptor opening on the other module. One criterion with which to evaluate whether or not a combination is meaningful between two function modules could be the weight of the function module, such that a combination should be avoided, in which the assembled device 1 exceeds a predetermined weight. Through this, both the durability of the device 1 and the characteristics of the mechanical and electrical interfaces 10 and 11 are assured. A further criterion could take into account individual measurement or test procedures. The power consumption of the individual function modules and their functional units may also be used as criteria in order to avoid power supply overload arising in the base module.

What is claimed is:

1. A modular structured, portable device for measuring or testing components of optical or electrical networks, with a base module, which contains base electronics and control and display panels located in the front area, and with at least one function module, which is attached externally to the reverse side of the base module via a mechanical interface and which contains a functional unit with measuring or testing electronics, which operates with the base electronic via a functional interface, wherein the function module is attached to the base module and may be replaced with a different function module with a different functional unit, depending upon application.

2. A device according to claim 1, wherein a mechanical interface is attached at a reverse side of the function module through which an additional function module can be attached to the reverse side of the first function module, which contains a different functional unit, which interact through a functional interface with the functional unit of the function module or with the measuring or test electronics.

3. A device according to claim 2, wherein the mechanical interface between function module and base module and the mechanical interface between two function modules are essentially identical.

4. A device according to claim 1, wherein each mechanical interface features quick connectors, which lock in place automatically when the function module is being attached, wherein disengaging means can be used through which the lock can be released to detach the function module.

5. A device according to claim 1, wherein the functional interface between two modules features at least one component at the reverse side of one module and at least a complementary component at the front side of the other module, wherein these components are shaped in such a manner that they couple automatically when one module is being attached to the other.

6. A device according to claim 1, wherein the functional interface between two function modules and the functional interface between function module and base module are essentially identical.

7. A device according to claim 1, wherein a final module designed as a protective element is integrated into a reverse side of the last function module.

8. A device according to claim 1, wherein a final module is provided, which can be attached via a mechanical interface outside to a reverse side of the last function module.

9. A device according to claim 8, wherein the mechanical interface between the function module and the base module is not compatible with the mechanical interface between the final module and the function module.

10. A device according to claim 8, wherein the mechanical interface between the function module and the base module and the mechanical interface between the final module and the function module are essentially identical.

11. A device according to claim 1, wherein the mechanical interface on one module features at least one stationary retaining hook, which sticks out on one side and engages into a retaining opening on the other module thus reaching behind an opening rim, and where the mechanical interface on one module also features at least one pivoting snap-fit which sticks out on a side opposite to the retaining hook and engages into a lock opening on the other module thus locking in place by reaching behind an opening rim.

12. A device according to claim 11, wherein the module with at least one snap-fit features disengaging means, which interact with at least one snap-fit and when operated cause the snap-fit to swivel back by releasing the opening rim.

13. A device according to claim 1, wherein the functional interface is designed as an electrical or optical interface.

14. A device according to claim 1, wherein the device is designed as an electrical time domain reflectometer or encompasses an electrical time domain reflectometer.

15. A device according to claim 1, wherein the device is designed as an optical time domain reflectometer or encompasses an optical time domain reflectometer.

16. A device according to claim 1, wherein the device is designed as a wavelength division multiplexing test device or encompasses a wavelength division multiplexing test device.

17. A function module for a device according to claim 1, wherein said functional unit with measuring or testing electronics, has at least one mechanical interface and at least one functional interface.

18. A modular structured, portable device for measuring or testing components of optical or electrical networks, the device comprising:

a base module, said base module having base electronics and control and display panels located in the front area;

a plurality of function modules, said plurality of function modules being interchangeable via a mechanical interface attachable outside on a reverse side of the base module, wherein each of said plurality of function modules has a functional unit with measuring and testing electronics, said functional unit interacting at one of said plurality of function modules being attached to said base module with the base electronics via a functional interface, wherein said plurality of function modules each differ in regards to a functional units depending upon an application.

19. A device system according to claim 18, wherein each of said plurality of function modules are equipped with a mechanical coding device, said mechanical ceding device being coded such that a functionally nonsensical combination of said plurality of function modules cannot be installed.

20. The device system of claim 19, wherein the coding of each coding devices is based on a parameter being selected from the group consisting of a function of said respective functional unit, a power consumption of said respective functional unit, a the weight of said respective function module, and any combinations thereof.

21. A function module for a device according to claim 18, wherein said functional unit with measuring or testing electronics has at least one mechanical interface and at least one functional interface.

* * * * *